(12) United States Patent
Webster et al.

(10) Patent No.: US 9,277,092 B2
(45) Date of Patent: Mar. 1, 2016

(54) CONFIGURABLE DOCUMENT SERVER

(75) Inventors: Jason K. Webster, Tucson, AZ (US);
Michael Riedel, Tucson, AZ (US);
Byron Dale Hunt, Jr., Tucson, AZ (US);
Treber Rebert, Tucson, AZ (US);
Jonathan Isabelle, Tucson, AZ (US);
William Robert Harman, Tucson, AZ (US)

(73) Assignee: Open Text S.A., Luxembourg (LU)

( * ) Notice: Subject to any disclaimer, the term of this patent is extended or adjusted under 35 U.S.C. 154(b) by 0 days.

(21) Appl. No.: 12/495,743

(22) Filed: Jun. 30, 2009

(65) Prior Publication Data

US 2010/0007917 A1    Jan. 14, 2010

Related U.S. Application Data

(63) Continuation of application No. 11/833,148, filed on Aug. 2, 2007, now abandoned.

(60) Provisional application No. 60/835,228, filed on Aug. 2, 2006.

(51) Int. Cl.
*G06F 3/12* (2006.01)
*H04N 1/00* (2006.01)
*H04N 1/32* (2006.01)
*H04L 12/58* (2006.01)

(52) U.S. Cl.
CPC ............ *H04N 1/324* (2013.01); *H04L 12/5855* (2013.01); *H04L 51/14* (2013.01); *H04N 1/00912* (2013.01); *H04N 1/32411* (2013.01); *H04N 1/32641* (2013.01)

(58) Field of Classification Search
None
See application file for complete search history.

(56) References Cited

U.S. PATENT DOCUMENTS

| 4,922,524 A | 5/1990 | Baba et al. |
| 5,237,430 A | 8/1993 | Sakurai et al. |

(Continued)

FOREIGN PATENT DOCUMENTS

| CA | 2741494 A1 | 5/2007 |
| WO | WO 2007/053720 A2 | 5/2007 |

OTHER PUBLICATIONS

International Preliminary Examination Report issued in International Patent Application No. PCT/US06/42741, Dec. 17, 2009, 12 pages.

(Continued)

*Primary Examiner* — Mohammad Ghayour
*Assistant Examiner* — Pawandeep Dhingra
(74) *Attorney, Agent, or Firm* — Sprinkle IP Law Group

(57) ABSTRACT

A configurable document server is described. In some embodiments, the configurable document server can enable administrators to set an option that prevents documents from being routed to users when the configurable document server experiences some types of errors. When the configurable document server determines that such an error condition exists, it may prevent the routing of the corresponding document. By preventing documents causing errors from being routed, the configurable document server enables administrators to improve the accuracy of document workflow and thereby improve productivity of users.

20 Claims, 11 Drawing Sheets

(56) References Cited

U.S. PATENT DOCUMENTS

| | | | |
|---|---|---|---|
| 5,289,532 A | 2/1994 | Ishikawa et al. | |
| 5,291,302 A | 3/1994 | Gordon et al. | |
| 5,305,376 A | 4/1994 | Ukegawa et al. | |
| 5,377,257 A | 12/1994 | Shirasaka et al. | |
| 5,412,710 A | 5/1995 | Tanaka et al. | |
| 5,423,043 A | 6/1995 | Fitzpatrick et al. | |
| 5,452,099 A | 9/1995 | Von Meister | |
| 5,472,905 A | 12/1995 | Paek et al. | |
| 5,483,580 A | 1/1996 | Brandman et al. | |
| 5,517,556 A | 5/1996 | Pounds et al. | |
| 5,559,860 A | 9/1996 | Mizikovsky | |
| 5,627,764 A | 5/1997 | Schutzman et al. | |
| 5,715,302 A | 2/1998 | Lee et al. | |
| 5,717,498 A | 2/1998 | Itoh et al. | |
| 5,717,744 A | 2/1998 | Yoshida et al. | |
| 5,742,905 A | 4/1998 | Pepe et al. | |
| 5,761,283 A | 6/1998 | Chung et al. | |
| 5,767,985 A | 6/1998 | Yamamoto et al. | |
| 5,781,886 A | 7/1998 | Tsujiuchi et al. | |
| 5,825,990 A * | 10/1998 | Heo et al. | 358/1.14 |
| 5,978,454 A | 11/1999 | King et al. | |
| 6,104,500 A * | 8/2000 | Alam et al. | 358/1.15 |
| 6,466,909 B1 | 10/2002 | Didcock et al. | |
| 6,477,494 B2 | 11/2002 | Hyde-Thomson et al. | |
| 6,487,533 B2 | 11/2002 | Hyde-Thomson et al. | |
| 6,549,612 B2 | 4/2003 | Gifford et al. | |
| 6,636,587 B1 | 10/2003 | Nagai et al. | |
| 6,745,221 B1 | 6/2004 | Ronca | |
| 6,785,021 B1 | 8/2004 | Gordon et al. | |
| 6,856,676 B1 | 2/2005 | Pirot et al. | |
| 6,906,817 B1 | 6/2005 | Berard et al. | |
| 6,928,482 B1 | 8/2005 | Ben Nun et al. | |
| 6,981,023 B1 | 12/2005 | Hamilton et al. | |
| 6,985,938 B2 * | 1/2006 | Ohsaki et al. | 709/223 |
| 7,142,550 B1 * | 11/2006 | Umansky | 370/401 |
| 7,151,763 B2 | 12/2006 | Koch et al. | |
| 7,230,745 B1 | 6/2007 | Street, Jr. | |
| 7,296,221 B1 * | 11/2007 | Treibach-Heck et al. | 715/224 |
| 7,653,185 B2 | 1/2010 | Rebert et al. | |
| 8,086,737 B2 * | 12/2011 | Chandrupatla et al. | 709/227 |
| 8,823,976 B2 | 9/2014 | Rebert | |
| 2001/0012126 A1 | 8/2001 | Mori | |
| 2001/0037423 A1 * | 11/2001 | Conway et al. | 710/129 |
| 2001/0052999 A1 * | 12/2001 | Hiraoka | 358/1.15 |
| 2002/0049767 A1 * | 4/2002 | Bennett | 707/104.1 |
| 2002/0049817 A1 | 4/2002 | Drory et al. | |
| 2002/0140986 A1 * | 10/2002 | Takayama | 358/402 |
| 2002/0176117 A1 | 11/2002 | Randalli et al. | |
| 2003/0117665 A1 * | 6/2003 | Eguchi et al. | 358/402 |
| 2003/0164986 A1 | 9/2003 | Boire-Lavigne et al. | |
| 2003/0193967 A1 | 10/2003 | Fenton et al. | |
| 2004/0080776 A1 * | 4/2004 | Garcia | 358/1.14 |
| 2004/0095612 A1 * | 5/2004 | Eguchi et al. | 358/402 |
| 2004/0114194 A1 * | 6/2004 | Eguchi et al. | 358/400 |
| 2004/0177337 A1 * | 9/2004 | Iida et al. | 717/104 |
| 2004/0184075 A1 * | 9/2004 | Hayashi et al. | 358/1.15 |
| 2004/0252348 A1 * | 12/2004 | Desai | 358/400 |
| 2005/0012965 A1 * | 1/2005 | Bloomfield | 358/402 |
| 2005/0021631 A1 | 1/2005 | El-Gazzar et al. | |
| 2005/0021800 A1 * | 1/2005 | Davison et al. | 709/230 |
| 2005/0021844 A1 * | 1/2005 | Puon et al. | 709/238 |
| 2005/0063005 A1 | 3/2005 | Phillips et al. | |
| 2005/0146753 A1 | 7/2005 | Firooz et al. | |
| 2005/0219614 A1 | 10/2005 | Garg et al. | |
| 2005/0254083 A1 | 11/2005 | Bodart | |
| 2006/0036649 A1 | 2/2006 | Simske et al. | |
| 2006/0048210 A1 | 3/2006 | Hildre et al. | |
| 2006/0072144 A1 | 4/2006 | Dowling et al. | |
| 2006/0123453 A1 | 6/2006 | Seiden | |
| 2006/0126101 A1 | 6/2006 | Shutt | |
| 2006/0189333 A1 | 8/2006 | Othmer | |
| 2006/0280165 A1 | 12/2006 | Blumenschein et al. | |
| 2007/0014614 A1 * | 1/2007 | Yoshida | 400/62 |
| 2007/0112946 A1 * | 5/2007 | Savov | 709/223 |
| 2007/0127384 A1 * | 6/2007 | Chandrupatla et al. | 370/242 |
| 2007/0130365 A1 | 6/2007 | Rebert et al. | |
| 2010/0182635 A1 | 7/2010 | Rebert | |
| 2010/0182651 A1 | 7/2010 | Rebert | |
| 2014/0344393 A1 | 11/2014 | Rebert et al. | |

OTHER PUBLICATIONS

Examination Report issued in Australian Patent Application No. 2007281113, Feb. 2, 2010, 2 pages.
Office Action issued in Canadian Patent Application No. 2,628,096, Mar. 16, 2010, 3 pages.
U.S. Appl. No. 60/812,709, filed Jun. 9, 2006, Rebert et al.
U.S. Appl. No. 60/732,167, filed Nov. 1, 2005, Rebert et al.
U.S. Appl. No. 60/731,949, filed Oct. 31, 2005, Rebert et al.
European Communication regarding Priority Documents; European Patent Application No. 06827326.7-1243, Mailed Jun. 5, 2008, 1 page.
European Communication regarding Priority Documents; European Patent Application No. 06827335.8-1243; Mailed Jun. 10, 2008, 1 page.
International Search Report and Written Opinion; International Patent Application No. PCT/US06/42731; Filed Oct. 31, 2006; Applicant: Captaris, Inc.; Mailed on Jul. 16, 2008; 13 pages.
International Search Report and Written Opinion; International Patent Application No. PCT/US06/42741; Filed Oct. 31, 2006; Applicant: Captaris, Inc.; Mailed on Jul. 16, 2008; 14 pages.
International Search Report and Written Opinion; International Patent Application No. PCT/US07/75111; Filed Aug. 2, 2007; Applicant: Captaris, Inc.; Mailed Oct. 10, 2008; 11 pages.
Notice of Acceptance issued in Australian Patent Application No. 2007281113, mailed Feb. 2, 2011, 3 pages.
Examiner's Report issued in Canadian Patent Application No. 2659607, mailed Feb. 3, 2011, 3 pages.
Office Action issued in U.S. Appl. No. 12/606,915, mailed Oct. 5, 2010, 11 pages.
Office Action issued in U.S. Appl. No. 11/833,148, mailed Dec. 30, 2008, 16 pages.
International Preliminary Examination Report issued in International Patent Application No. PCT/US06/42741, mailed Sep. 12, 2008, 11 pages.
International Preliminary Examination Report issued in International Patent Application No. PCT/US06/42731, mailed Dec. 15, 2010, 7 pages.
International Preliminary Report on Patentability (Chapter I) issued in International Patent Application No. PCT/US2006/042741 mailed Sep. 12, 2008, 12 pages.
Notification Concerning Republication of International Patent Application No. PCT/US2006/042741, WO2007/053720, mailed Oct. 2, 2008, 1 page.
International Preliminary Examination Report issued in International Patent Application No. PCT/US06/42741, completed Dec. 17, 2009, mailed Jan. 29, 2010, 11 pages.
International Preliminary Report on Patentability issued in International Patent Application No. PCT/US07/75111, mailed May 11, 2011, 9 pages.
Examiner's Report issued in Canadian Patent Application No. 2,628,099, mailed Mar. 29, 2011, 5 pages.
Office Action issued in U.S. Appl. No. 12/606,915, mailed Mar. 18, 2011, 11 pages.
European Search Report issued for European Patent Application No. 06 827 335.8, mailed Sep. 6, 2012, 7 pages.
European Search Report issued for European Patent Application No. 06 827 326.7, mailed Sep. 6, 2012, 6 pages.
Examiner's Report issued for Canadian Patent Application No. 2,741,494, mailed Feb. 2, 2012, 5 pages.
Office Action for U.S. Appl. No. 12/634,267 mailed Jan. 26, 2012, 12 pgs.
Canadian Examiner's Report issued for Canadian Patent Application No. 2,659,607 mailed May 30, 2012, 3 pages.
Office Action for U.S. Appl. No. 12/634,267 mailed Jul. 3, 2012, 16 pgs.

(56) References Cited

OTHER PUBLICATIONS

European Search Report issued for European Patent Application No. 07 813 722.1, mailed Feb. 7, 2013, 7 pages.

Office Action issued for U.S. Appl. No. 12/606,915, mailed Dec. 26, 2013, 11 pages.

Final Office Action issued for U.S. Appl. No. 12/606,915, mailed Sep. 16, 2013, 10 pages.

Canadian Examiner's Report issued for Canadian Patent Application No. 2,659,607, mailed Oct. 7, 2013, 3 pages.

Notice of Allowance for U.S. Appl. No. 12/606,915, mailed May 7, 2014, 8 pgs.

Examiner's Report for Canadian Patent Application No. 2,659,607, mailed Sep. 26, 2014, 3 pgs.

Office Action for U.S. Appl. No. 12/634,267, mailed Nov. 28, 2014, 14 pgs.

Examiner's Report for Canadian Patent Application No. 2,807,838, mailed Nov. 24, 2014, 4 pgs.

Office Action for U.S. Appl. No. 14/446,937, mailed Apr. 23, 2015, 16 pgs.

Office Action for U.S. Appl. No. 12/634,267, mailed Jun. 11, 2015, 13 pgs.

Office Action for Canadian Patent Application No. 2659607, mailed Sep. 22, 2015, 5 pgs.

Notice of Allowance for U.S. Appl. No. 12/634,267, mailed Sep. 23, 2015, 5 pgs.

Office Action for U.S. Appl. No. 14/446,937, mailed Oct. 23, 2015, 10 pgs.

* cited by examiner

CONFIGURABLE DOCUMENT SERVER

CROSS-REFERENCE TO RELATED APPLICATIONS

This patent application is a continuation of U.S. patent application Ser. No. 11/833,148, filed Aug. 7, 2007, abandoned, entitled CONFIGURABLE DOCUMENT SERVER, which claims the benefit of U.S. Provisional Patent Application Ser. No. 60/835,228, filed Aug. 2, 2006, entitled "Rightfax Improvements," which are incorporated herein in their entirety by reference. This patent application also incorporates by reference commonly assigned U.S. patent application Ser. No. 11/591,449, filed Oct. 31, 2006, abandoned, entitled "Queue Processor for Document Servers," U.S. patent application Ser. No. 12/606,915, filed Oct. 27, 2009, pending, which is a continuation of U.S. patent application Ser. No. 11/591,449, U.S. patent application Ser. No. 11/591,446, filed Oct. 31, 2006, now U.S. Pat. No. 7,653,185, U.S. patent application Ser. No. 12/634,267, filed Dec. 9, 2009, pending, which is a continuation of U.S. patent application Ser. No. 11/591,446, and U.S. Pat. No. 6,747,761 filed on Oct. 29, 1996, entitled "Delivery Expert System and Method."

BACKGROUND

Computer networks generally enable data communications between computing devices ("network nodes") that are connected to such computer networks. Many such computer networks are interconnected, such as via the Internet, and can have "transports" that transport documents and other computer files between network nodes. A document is a container for any type of digital content, including facsimiles, voice messages, videos, word processing documents, spreadsheets, and any other type of media, including multimedia.

Conventional transports have various deficiencies. As an example, conventional transports cannot intelligently select a network from multiple available networks based on the type of document that needs to be communicated between computing devices. Instead, they generally use the same network to transport documents without regard as to whether some networks may be better adapted to transport a particular document type. Moreover, document servers may not route documents even though documents may not be correctly converted, received, or transmitted.

Figure 1:
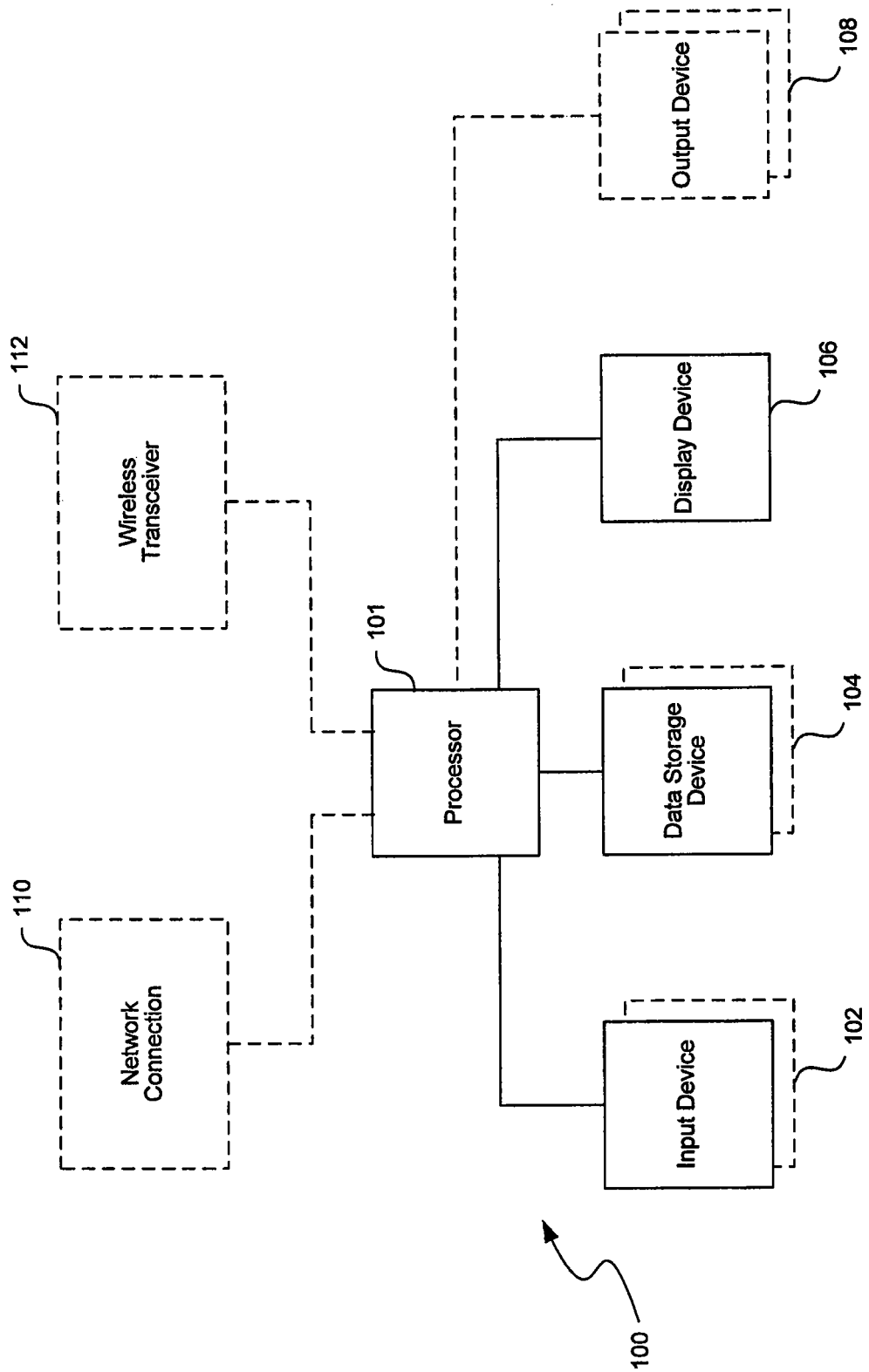
FIG. 1 is a block diagram illustrating a suitable computing system in which aspects of the invention may be implemented.

The headings provided herein do not necessarily limit the scope of the invention.

DETAILED DESCRIPTION

Various embodiments of the invention will now be described. The following description provides specific details for a thorough understanding and enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments The terminology used in the description presented below is intended to be interpreted in its broadest reasonable manner, even though it is being used in conjunction with a detailed description of specific embodiments of the invention. Some terms may even be emphasized below. However, any terminology intended to be interpreted in any restricted manner will be overtly and specifically defined as such in this Detailed Description section.

A configurable document server is described. In some embodiments, the configurable document server can enable administrators to set an option that prevents documents from being routed to users when the configurable document server experiences some types of errors. As an example, an administrator can configure the document server to prevent routing of inbound facsimile messages when those facsimile messages are incomplete because of transmission or reception errors. The configurable document server may determine that an error has occurred when the inbound facsimile was not completely transmitted, when the power fails, when the connection terminates, or other error conditions occur. Alternatively, the configurable document server may determine that documents that could not be converted from one document format to another because of an error should not be routed. When the configurable document server determines that such an error condition exists, it may prevent the routing of the corresponding document. As an example, the configurable document server may instead route the document to an administrator or identify the document to the administrator. By preventing documents causing errors, such as facsimile documents with transmission errors, from being routed, the configurable document server enables administrators to improve the accuracy of document workflow and thereby improve productivity of users.

A configurable queue processor for document servers is described. In some embodiments, the configurable queue processor allocates server resources in an optimal manner such that document servers can process documents efficiently. Server resources include, e.g., processors, disk space, network bandwidth, etc. A document server is a server that handles documents or otherwise processes documents, such as servers that process facsimiles, copies, print jobs, scanning jobs, optical character recognition jobs, voice messages, document transmissions, document conversions, archiving, and indeed any type of document processing request. Document servers may receive multiple documents of various types. The configurable queue processor allocates one or more "document flows" to handle the incoming documents. A document flow is a component of a document server that manages the processing of one or more documents or document types. As an example, the configurable queue processor may allocate multiple document flows and configure each document flow to handle different types of documents. The document flows receive documents they are configured to handle from a queue and handle the documents according to each document's type. The document flows can provide the received documents to appropriate document handlers, such as for sending a facsimile, making a copy, printing, optical character recognition, etc.

In various embodiments, the document flows can retrieve documents from a queue or may be provided documents by another component, such as the configurable queue processor.

The configurable queue processor can be configured by a user, such as an administrator, to allocate document flows in an identified manner. As an example, an administrator may determine that facsimile transmissions are to receive higher priority during the day than another type of document processing service the document server provides, but can receive a lower priority at night. Alternatively, the configurable queue processor can allocate document flows dynamically to balance system load. As an example, the configurable queue processor may allocate an identified number of document flows and, as server resources become available or are consumed, can increase or decrease the number of document flows. Alternatively, the configurable queue processor may increase or decrease the number of document flows as the queue of documents waiting to be processed increases or decreases. As an example, the configurable queue processor may increase the number of document flows that handle facsimiles as the number of waiting facsimiles in the queue increases.

In some embodiments, the configurable queue processor may increase the number of queues that hold pending documents.

In various embodiments, the configurable queue processor may allocate document flows across one or more document servers. Alternatively, each document server may have its own configurable queue processor that allocates document flows on that document server.

Thus, by using multiple document flows, the configurable queue processor can tune system performance to manage a document's time in the queue, such as by managing system performance or resources. This permits flexible management of queues in document servers, such as to prevent bottlenecks associated with the processing of multiple document types, events, and network protocols.

Various techniques can be employed to enable communication between the configurable queue processor and allocated document flows. These include shared memory, named pipes, remote procedure calls, application programming interface invocations, etc.

The document flows that the configurable queue processors create communicate with universal Document Transport ("DocTrans") modules to process documents or forward documents for processing. The DocTrans modules may be adapted for use with document servers for recognizing document requests, interacting with routing rules and workflow requirements, and generally managing document flows between network nodes, including other document servers. The DocTrans module can function with a document server (e.g., a RightFax server) to recognize document requests, interact with document routing rules and workflow requirements, and manage document flows between network nodes or devices. The DocTrans module provides to its operator multiple benefits over conventional transports. Examples include providing a common processing architecture for all message transports rather than requiring individual processing engines for multiple transport types; having common scheduling and queuing support for each transport type; and selecting document- or hardware-specific processing tasks by reference to the type of protocol. This feature is prevalent now given the wide use of multifunction devices such as all-in-one print/scan/copy/fax/telephone/answering machine devices, which may be enhanced with audio & video capture, messaging, email, network router & gateway capabilities. It is also a benefit to use DocTrans modules to integrate messaging and workflow operations when using standalone machines that perform these functions on a network.

Various techniques can be employed to enable communication between the configurable document flows and their corresponding DocTrans modules. These include shared memory, named pipes, remote procedure calls, application programming interface invocations, etc.

The DocTrans module provides methods for transporting documents between network devices, such as printers, fax boards, and document servers (e.g., RightFax 9.0 facsimile server by Captaris, Inc. of Bellevue, Wash.) across local and wide-area networks, and permits document transport and routing optimization with other types of communications networks (e.g., messaging services, telephony, and Internet Protocol ("IP") networks). Document servers can handle faxes and other documents, such as for routing purposes. The module can route documents instead of, or in addition to, a board server, such as a fax board server. The DocTrans module routes documents in a manner that is similar to how a board server routes documents, except that the DocTrans module can route documents based on a document type or a transport's type in addition to just phone number, user, group, and so forth. In addition, the DocTrans module exposes an interface that permits other types of document transport mechanisms (e.g., multi-function devices, email, and SMS servers) to operate with various networks systems, and to be extended so that routing operations (such operations as Start-Transmission, SendDocument, ReceiveDocument, EndTransmission, or StatusCheck) can be readily used with other network services.

The DocTrans module can be implemented as an independently configurable software module that transports content and related metadata across computer networks. It can function as a communication layer between various computer networks and network servers that perform discrete document creation, storage and transmission tasks. The DocTrans module can operate independently of the originating message service or source of a document to perform operations on documents, such as send, receive, or cache documents and messages, once a task is loaded, and can operate independently to receive items (such as facsimile tasks) for forwarding later. It permits flexible, programmable, and optimized rules-based routing of documents in various message formats and on multiple network types.

Conventional fax products did not provide board servers with loading balancing capabilities or analysis of cost, time, or security rules for routing across multiple types of document and messaging protocols (e.g., MIME, SMS, T.37 fax, T.38 fax). By contrast, the DocTrans module is extensible to perform document transport and load equalization on virtually all document types and network types using those messaging protocols. This feature is prevalent now given the wide use of multifunction devices such as all-in-one print/scan/copy/fax/telephone/answering machine devices, which may be enhanced with audio & video capture, messaging, email, network router & gateway capabilities. It is also a benefit to use DocTrans modules to integrate messaging and workflow operations when using standalone machines that perform these functions on a network.

Turning now to the figures, FIG. 1 and the following discussion provide a brief, general description of a suitable computing environment in which aspects of the invention can be implemented. Although not required, aspects and embodiments of the invention will be described in the general context of computer-executable instructions, such as routines executed by a general-purpose computer, e.g., a server or personal computer. Those skilled in the relevant art will appreciate that the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, wireless network devices, mainframe computers and the like. The invention can be embodied in a special purpose computer or data processor that is specifically programmed, configured or constructed to perform one or more of the computer-executable instructions explained in detail below. Indeed, the term "computer", as used generally herein, refers to any of the above devices, as well as any data processor.

The invention can also be practiced in distributed computing environments, where tasks or modules are performed by remote processing devices, which are linked through a communications network, such as a Local Area Network ("LAN"), Wide Area Network ("WAN") or the Internet. In a distributed computing environment, program modules or sub-routines may be located in both local and remote memory storage devices. Aspects of the invention described below may be stored or distributed on computer-readable media, including magnetic and optically readable and removable computer discs, stored as firmware in chips (e.g., EEPROM chips), as well as distributed electronically over the Internet or over other networks (including wireless networks). Those skilled in the relevant art will recognize that portions of the invention may reside on a server computer, while corresponding portions reside on a client computer. Data structures and transmission of data particular to aspects of the invention are also encompassed within the scope of the invention.

Referring to FIG. 1, one embodiment of the invention employs a computer 100, such as a personal computer or workstation, having one or more processors 101 coupled to one or more user input devices 102 and data storage devices 104. The computer is also coupled to at least one output device such as a display device 106 and one or more optional additional output devices 108 (e.g., printer, plotter, speakers, tactile or olfactory output devices, etc.). The computer may be coupled to external computers, such as via an optional network connection 110, a wireless transceiver 112, or both.

The input devices 102 may include a keyboard and/or a pointing device such as a mouse. Other input devices are possible such as a microphone, joystick, pen, game pad, scanner, digital camera, video camera, and the like. The data storage devices 104 may include any type of computer-readable media that can store data accessible by the computer 100, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network such as a local area network (LAN), wide area network (WAN) or the Internet (not shown in FIG. 1).

Figure 2:
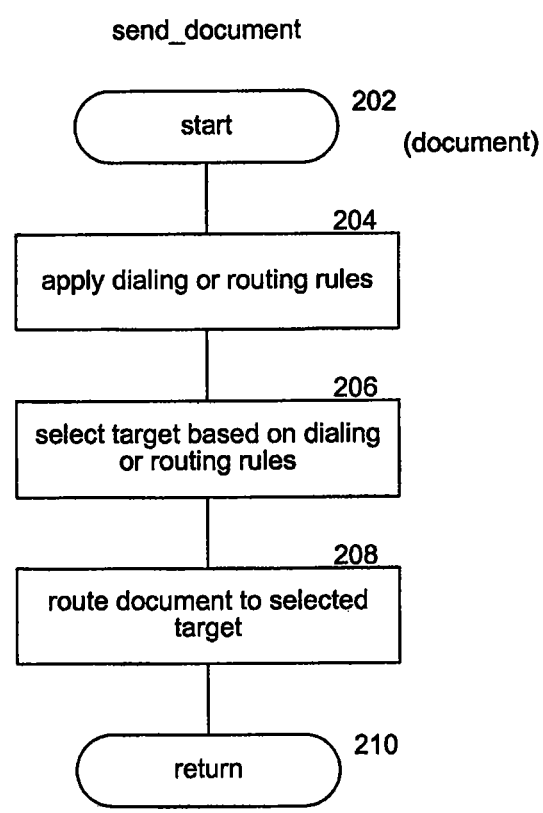
FIG. 2 is a flow diagram illustrating a send_document routine invoked by a Document Transport module in some embodiments.

FIG. 2 is a flow diagram illustrating a send-document routine performed by the DocTrans module in some embodiments. The routine may be employed by the facility to send a document, such as a fax document. The routine begins at block 202 where it receives an indication of a document as a parameter.

At block 204, the routine applies dialing or routing rules to the indicated document. The dialing or routing rules determine how the facility is to transport or route a document. As an example, dialing or routing rules may indicate that a document that is to be sent at a specific time or is from a particular user is to be sent using a specific document transport.

At block 206, the routine selects a target based on the applied dialing or routing rules. As examples, the routine may select a public service telephone network ("PSTN"), another RightFax server, a board server containing one or more communications devices, and so forth. As examples, the DocTrans may select a target based on metadata, type of document, or other attributes relating to the document.

At block 208, the routine routes the document to the selected target. The selected target may perform additional analyses on the document and route the document to another DocTrans so that the document can be routed appropriately.

At block 210, the routine returns.

Figure 3:
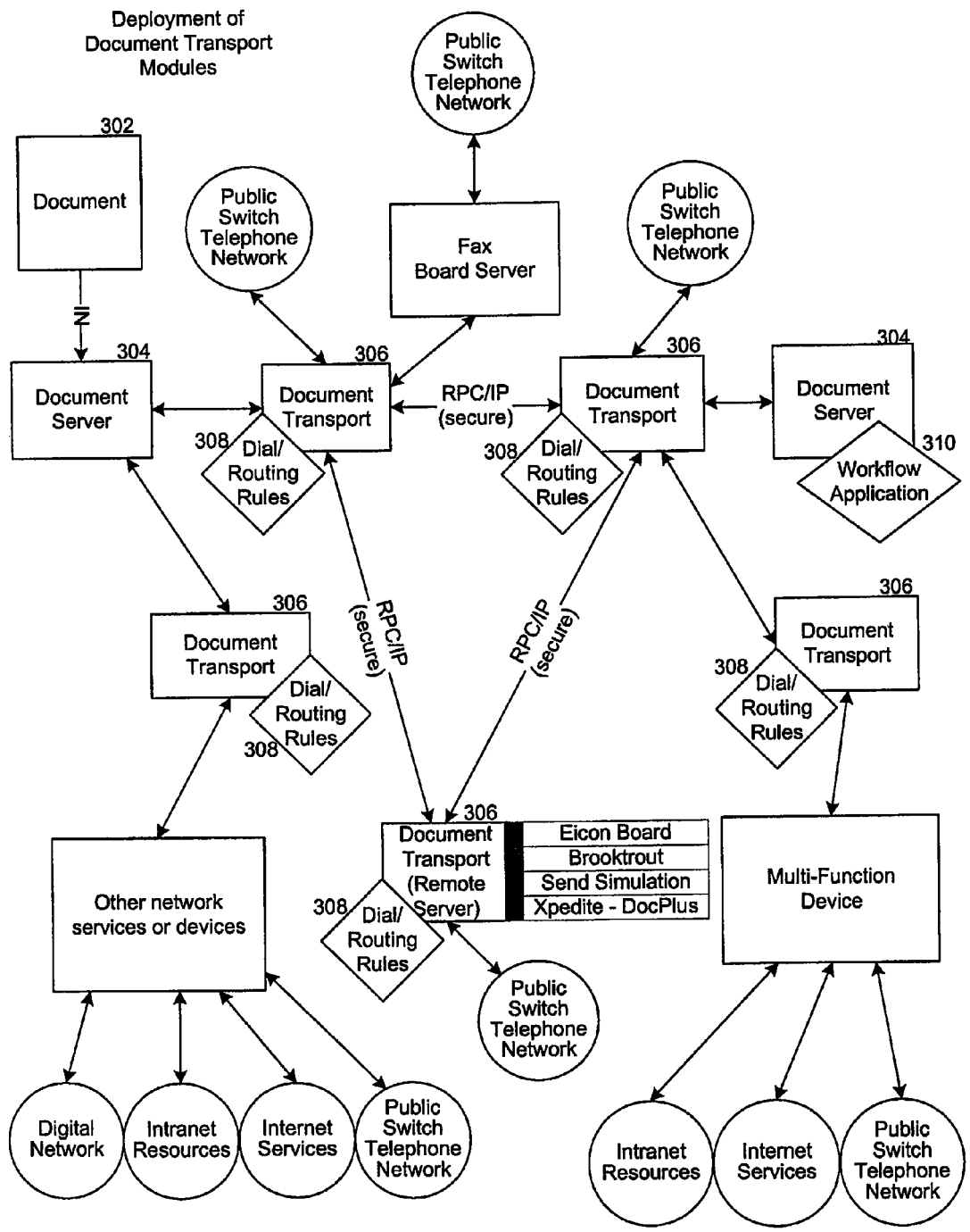
FIG. 3 is a block diagram illustrating use of the Document Transport in some embodiments.

FIG. 3 is a block diagram illustrating use of the DocTrans in some embodiments. According to the illustrated embodiment, a document 302 enters a RightFax server 304, such as after the document is scanned. A workflow application 310 may take various workflow steps, such as when the document is scanned, received, sent, etc. This document is routed to a DocTrans module 306. This DocTrans could reside in the same computing device as the RightFax server or in a different computing device, in which case it is referred to as a "Remote DocTrans." The DocTrans may invoke the "send-document" routine described above in relation to FIG. 2 to route the document to another DocTrans module. Once the document has been transferred to one of the DocTrans modules, dialing or routing rules 308 may be applied to this document. Dialing or routing rules can be applied based on information pertaining to the document, such as phone number, DocTrans, group, users, etc. A dialing rule may cause the document to be routed to another DocTrans, or to a specific type of transport. Transports include, e.g., fax boards (e.g., from Brooktrout, Eicon, Intel, etc.), SMS devices, routers (e.g., from Cisco) for T.38 fax, email, T.37 (Store and Forward) fax, a DocPlus (e.g., Xpedite) provider, virtual implementation of the above, including document transmission simulations (e.g., evaluating cost, schedule, destination, and security for transmission), and so forth.

Extensibility and Routing Priorities

Since the DocTrans operates independently of network connections, content servers, or network resources providing the document, it can readily be configured to handle multiple document types and route documents to multiple types of network connections. As an example, the addition of email MIME types provides a secure and reliable transport for email from any point on the network. Moreover, the facility can confirm deliverability of the email, verify or certify receipt of contents and attachments; confirm results of operations performed by the DocTrans in routing the document to various network nodes for storage, transmission, and notifications; and so forth. By using rules that employ a TCP/IP transport between RightFax servers with encryption and secure session protocols (e.g., contrasted with open transmission on telephone lines), the DocTrans can provide secure routing of documents, such as facsimile ("fax") documents. To secure email messages and attachments, the fax server could provide certified delivery for documents or messages encrypted by the source server. As an example, the fax server could employ independent sender and recipient verifications and notifications for certified delivery.

Figure 4:
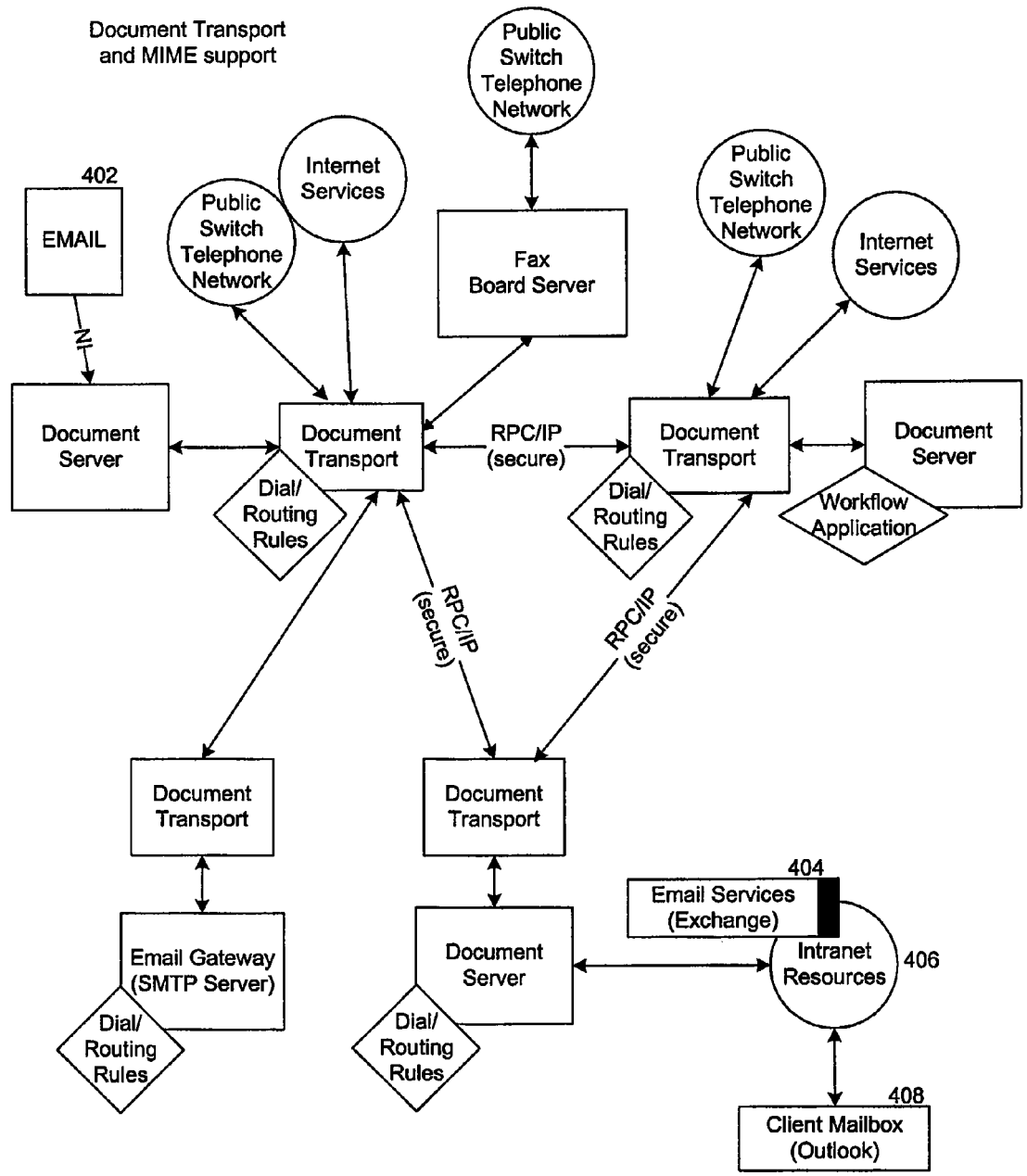
FIG. 4 is a block diagram illustrating a Document Transport with MIME support.

FIG. 4 illustrates a DocTrans with MIME support, such as for using email with a DocTrans module in some embodiments. While the figure illustrates a MIME-type document, other document types are also possible. Flexible routing based on DocTrans permits simple mail transport protocol ("SMTP") services for email operating with the RightFax server to transmit an email document 402 between DocTrans modules associated with RightFax servers directly, then into a client inbox (e.g., Microsoft® Outlook®) 408 on a RightFax client machine via an Intranet 406 and an email server 404. The illustrated embodiment identifies several advantages over the prior art. Because there are redundant links between DocTrans modules, "failsafe" transmission becomes possible. As an example, when one DocTrans node is unavailable, the facility can employ another DocTrans module to ensure that the document is delivered. Content services on a RightFax server can archive, search & retrieve, and store native documents, such as emails and their attachments. The system can apply workflow by using, for example, Captaris' RightFax EDC API or Captaris' WorkFlow product, such as to accomplish multiple tasks with the same transmission (e.g., storing, logging, notifying, printing, and archiving). Metadata regarding the document, its routing to known DocTrans modules, and the network and communication resources available can be stored and applied as well. For example, this information could be requested and bound to the fax server document or task log for each task for later retrieval.

Because the system has access to the intranet and Internet, it can verify and certify that emails and any related documents were delivered or that web links contained therein can be accessed. The system can deliver documents via alternate transport mechanisms. For example, if an email with MIME attachments could not be delivered, the system could alternately route the email text as an SMS message and provide the attachments as file pathnames or URL links. Alternatively, the DocTrans system can convert an SMS message into a facsimile, or a facsimile into a Fax-Over-IP (FOIP) document, and send it using one of several facsimile transports (e.g., telephone line, or T.37/T.38 fax over IP, etc.). The DocTrans system can also confirm the origin, validity, delivery and source of the document as required by using an independent, secure notification and document validation method.

In this manner, the system enables receiving and employing extensions for connecting to various transports, configuring dialing and routing rules for these transports, and handling the routing of message protocols, such as for MIME, SMS, T37 Fax, T38 Fax, and RightFax server. The system also enables extensions for specific facsimile hardware, such as Eicon and Brooktrout. Third party vendors that use RightFax ("RF") server for their document transport can enhance their capabilities by using DocTrans.

Least-Cost Routing

Figure 5:
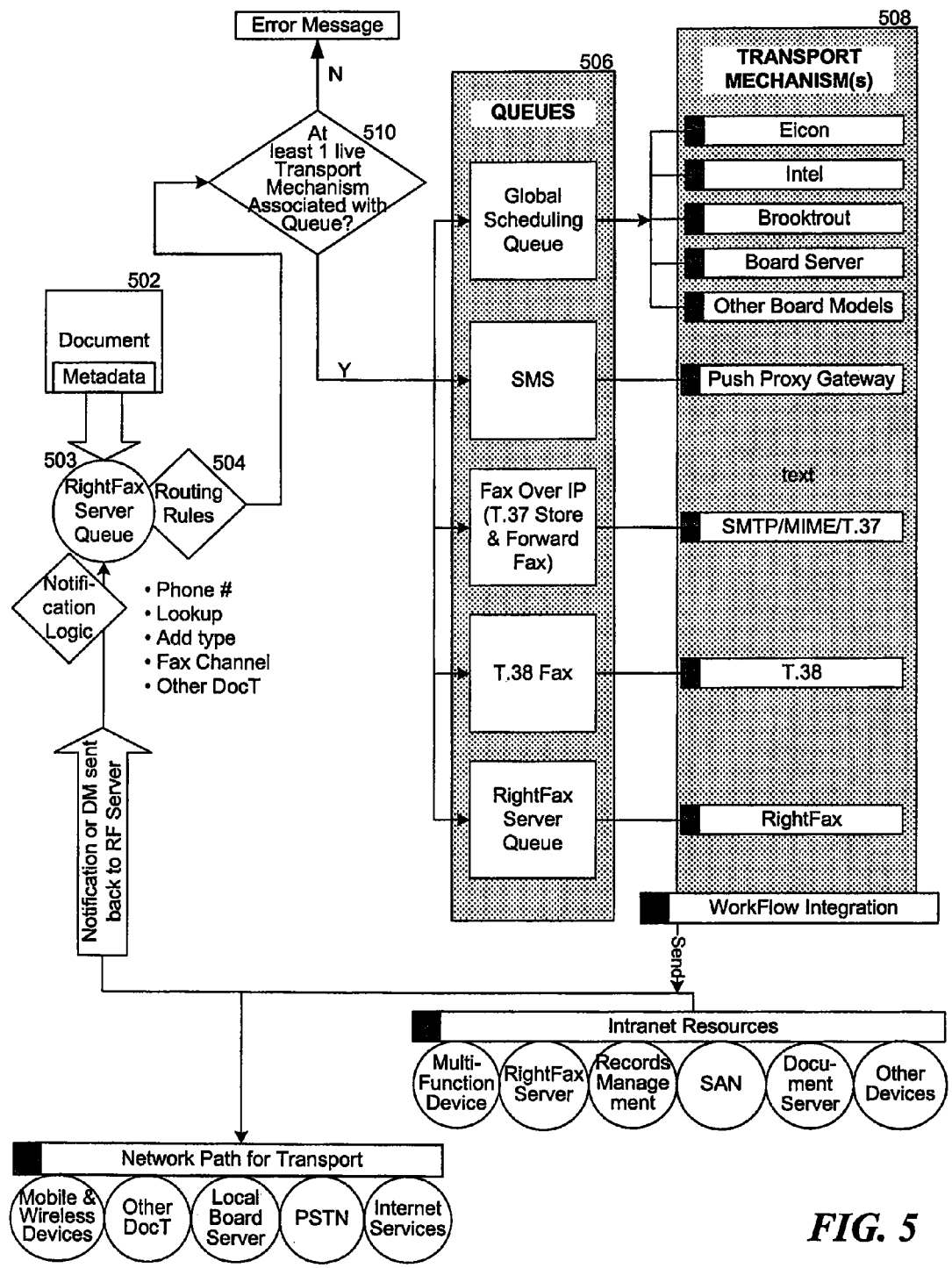
FIG. 5 is a block diagram illustrating rules for least-cost-routing and for store-and-forward document transport in some embodiments.

Least-cost routing rules enable transmission of facsimile documents over TCP/IP connections to other RightFax servers or to local multifunction printer devices, where the document may be printed, sent at local telephone rates rather than long distance rates, or transmitted over an available TCP/IP connection. In particular, using server-to-server IP network transmission of faxes enables managing the long-distance calling costs of sending faxes on telephone networks. Moreover, the facility can then employ local storage to replicate documents. The ability to store-and-forward documents in local networks (e.g., in RightFax servers or client inboxes) with logging for verification of receipt and retention of copies, enables re-transmission to be accomplished locally should the printed document or original email attachment be lost or inadvertently deleted. FIG. 5 is a block diagram illustrating rules for least-cost-routing and for store-and-forward document transport in some embodiments. According to the illustrated embodiment, rules for least-cost-routing and for store-and-forward document transport on the network can be applied by the queuing and routing system. The correct routing for a document can be determined with reference to the document type, transport protocol, availability of communications channels, availability of and load on network resources, and so forth.

A document 502 with metadata (e.g., metadata that contains information pertaining to a sender) enters a server queue 503 of a DocTrans. After routing rules 504 are applied to the document (e.g., based on the metadata) the document is scheduled on one of DocTrans's queues 506. These queues allow the DocTrans to treat all document types in a similar fashion. As an example, all Transport Mechanisms ("transports") 508 can implement the same or a similar application program interface (API) to interact with these queues and receive documents for transmission. DocTrans is also able to identify documents based on document type (e.g., SMS, email, or RightFax) or transmission type (e.g., fax board transmission, T.37 transmission, or T.38 transmission). The transports act as plug-ins to the DocTrans (e.g., all have identical or similar interfaces, such as for various operations including StartTransmission, SendDocument, ReceiveDocument, EndTransmission, etc.) and new libraries supporting these operations can extend transmission capabilities in the DocTrans to add a new protocol. Also, in some embodiments, a queue will be serviced if a transport that services that type of queue has been configured on the DocTrans. In some embodiments, the document may be enqueued when (510) a transport associated with a queue is available.

Figure 6:
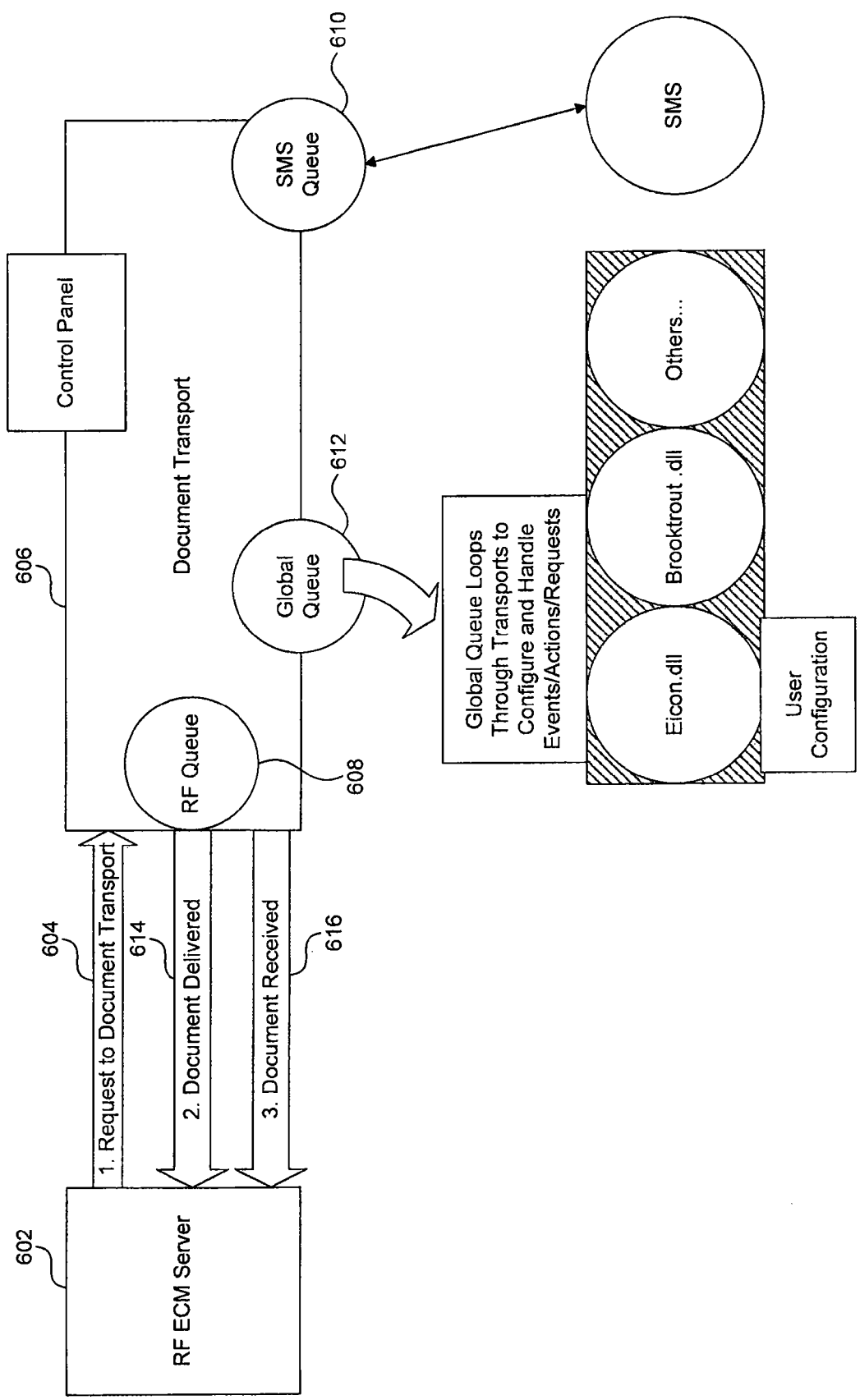
FIG. 6 is a block diagram illustrating some of the queue management done by separate protocols administered by Document Transport.

FIG. 6 illustrates aspects of queue management performed by protocols administered by DocTrans in some embodiments. The illustrated embodiment indicates how queue management can be separated from each transport type. In some embodiments, each queue is managed by a DocTrans module. Multiple transport types can be plugged-in and can service a corresponding queue. The DocTrans module performs queue management, maintenance, and scheduling of sending/receiving documents. According to the illustrated embodiment, a RightFax server 602 sends a request 604 to a DocTrans module 606. Based upon dialing or routing rules, the DocTrans module determines whether to use a RightFax queue 608, SMS queue 610, or global queue 612. The RightFax queue 608 may be configured to transport documents between other RightFax servers. The SMS queue 610 may be configured to communicate with an SMS service provider. The global queue 612 handles board-level communications, such as by checking transports that are configured for use with the system, to determine whether one of these transports can handle the request 604. If one of the configured transports can handle the request, the global queue routes the request to that transport.

Upon receiving a document, the DocTrans module delivers the document 614 to the RightFax Server. The DocTrans module may also send notifications to the RightFax Server upon receipt of a document 616.

Load Balancing

Load balancing is a factor that DocTrans modules use to determine whether a document is to be processed or forwarded to another DocTrans module. All DocTrans modules can perform load equalization based on a comparison of its load with other DocTrans modules in the network. Rules based on such formulae may be applied using cost parameters, transmission times, schedule times, security or priority parameters, and routing and destination information. Similarly, a DocTrans module can be used in conjunction with a workflow application or simulation engine to estimate and to optimize such rules before or during their application to a document transmission task. As an example, DocTrans modules may perform load balancing based on the following formula: (total of X pages from Y Documents)/(number of send channels).

Another method varies the load calculation by channel and content type, such as by using the following formula:

(Waiting Pages Of This Type*Expected Transport Time Per Page Of This Document Type)/Number # of Channels Sending This Document Type.

These formulae may be evaluated for each document type. For example, if e-mail can be sent in 3 seconds and a fax can be sent 1 minute, there are 60 one "page" e-mails queued, 50 one page faxes queued, and there are 2 e-mail channels, and 24 fax channels, the e-mail load would be:

60*3/2=90 and the fax load would be:

50*60/24=125

Managing Network Connections

If a resource is unavailable, such as because of a server outage, it may not be considered for load balancing for a period of time (e.g., 40 minutes) to permit the resource to be restored or reconfigured. This applies to DocTrans, PSTN, Board Servers, and RightFax servers. In some cases, the system may use the local DocTrans to PSTN connection to transmit documents, even if that is not the preferred configuration or least-cost routing for the document, such as when other network resources are unavailable.

Grouping Using DocTrans

Conventional facsimile transmission has costs associated relating to connections, such as call initiation and duration. The process of grouping avoids contention for connection resources or accrual of connection initiation charges when multiple documents are directed to the same destination. Grouping can prevent tasks from waiting on a "busy" line while other tasks to the same destination are sending documents.

The grouping process can be implemented as follows: set the number of pages or length of the transmission (to prevent unlimited send time on the channel), identify and cache queued documents with the same destination identifier, open connections on the transport, and send the documents with the same destination identifier over the open connection.

The group send feature may update its cache of queued documents with documents that enter the queue during transmission of a group, so long as the new documents share the same destination identifier.

Implementation of DocTrans in Various Embodiments:

In various embodiments, a framework for accepting a plug-in style implementation DLL for each transport type (or group of types) is provided. Each DLL implements a predefined set of entry points that enable support of various transport types.

Each entry point takes a resizable context structure that supports all information transferred between the DocTrans and the DLL. The document transports tolerate changes in the context structures' sizes, and each document transport independently supports operations such as store & forward, task scheduling, sender or recipient intervention, least-cost routing rules, document or task lifespan, and deliver-or-delete options without breaking the document task.

Figure 7:
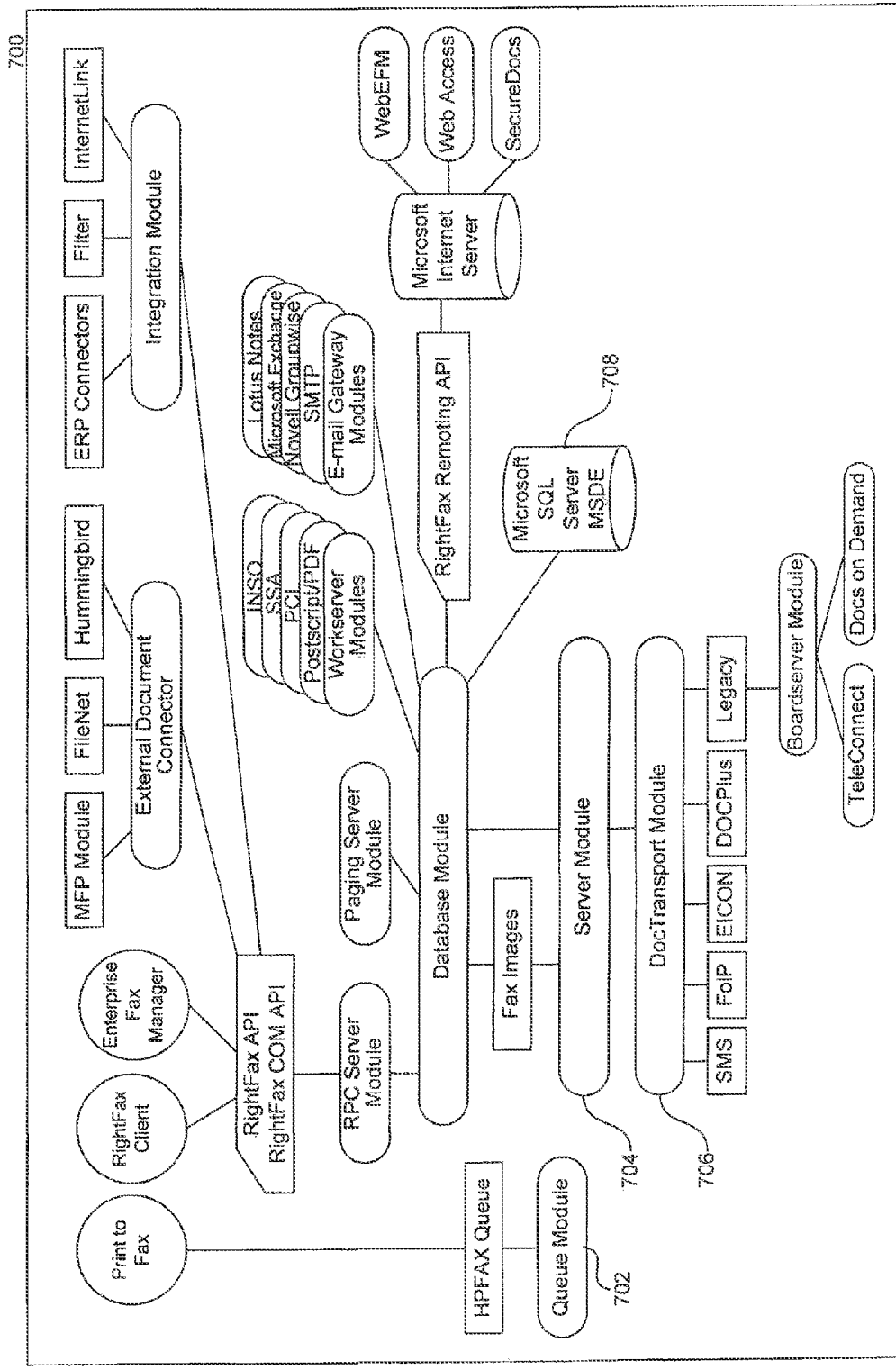
FIG. 7 is a block diagram illustrating an environment in which a configurable queue processor may operate in some embodiments.

Configurable Queue Processor:

FIG. 7 is a block diagram illustrating an environment in which a configurable queue processor may operate in some embodiments. A document server 700 contains multiple components, including a configurable queue processor 702, server module 704, and a DocTrans module 706. The document server can contain zero or more of any of these components. The configurable queue processor 702 can allocate or deallocate document flows, such as by invoking an application program interface (API) provided by the server module 704. The server module 704 may associate each allocated document flow with a DocTrans module 706. The server module 704 may access a queue associated with the configurable queue processor. The queue can be stored in a database, such as a SQL server 708 or in any other memory associated with the server and shared by the configurable queue processor and the document flows it allocates.

Figure 8:
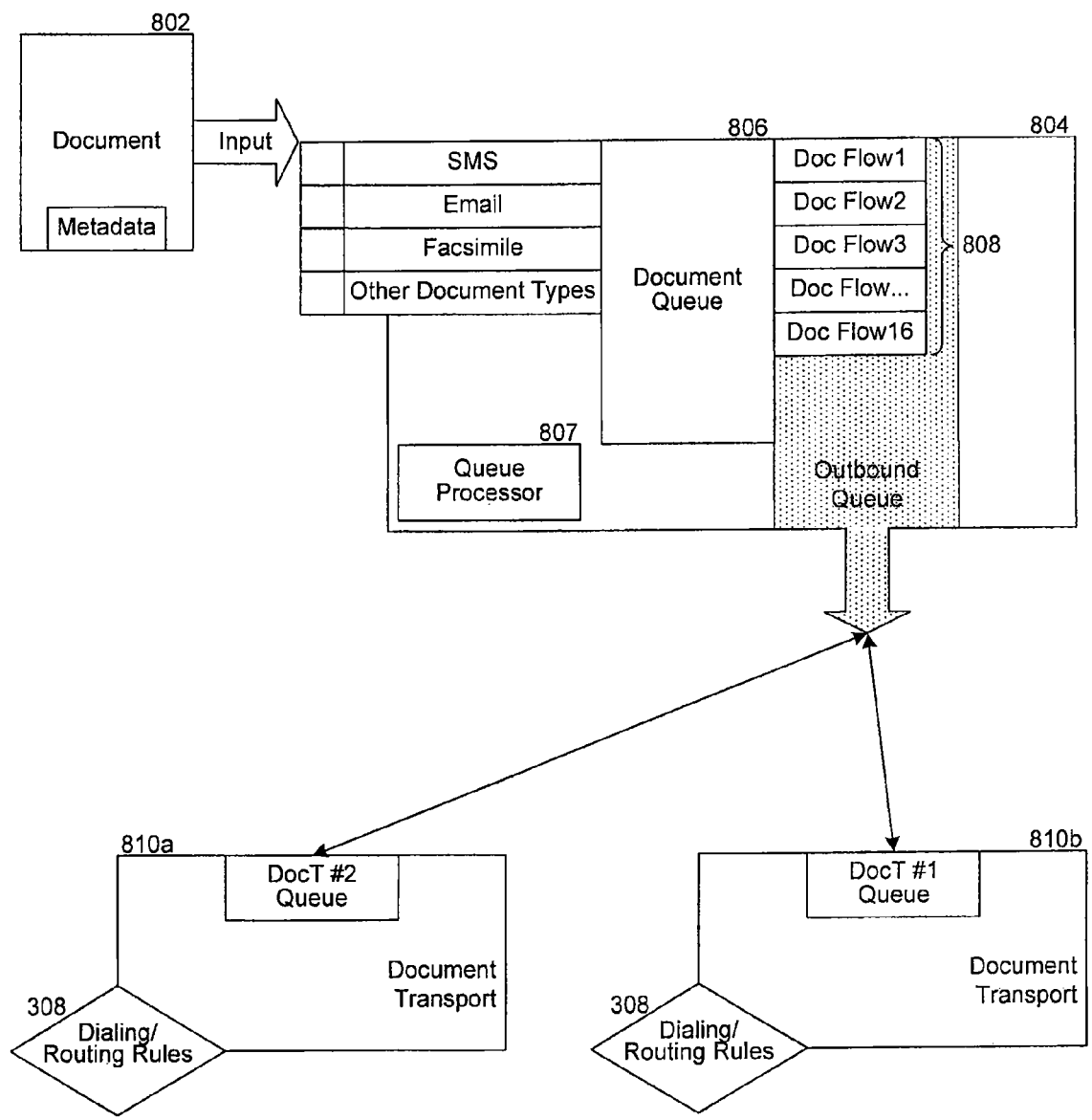
FIG. 8 is a block diagram illustrating operation of a configurable queue processor in some embodiments.

FIG. 8 is a block diagram illustrating operation of a configurable queue processor in some embodiments. A document 802 enters a document server 804, such as a facsimile server, and is placed in a document queue 806. A configurable queue processor 807 can allocate or deallocate document flows 808, such as based on the document server's resource utilization. Each document flow can be associated with one or more DocTrans modules 810, such as modules 810a and 810b. The DocTrans modules receive the documents from the queue via the document flows. As an example, a document flow can retrieve a document from the queue and provide the retrieved document to the associated DocTrans module for processing. DocTrans modules 810a and 810b may operate on different document servers. A document in the queue may be assigned for processing to a particular document flow based on the document's properties, such as its metadata or type. Example of properties that can be used in assigning a document to a document flow include the document's size, author, type, protocol used to send the document, and so forth. A component may assign documents to a document flow. Alternatively, a document flow may retrieve documents from the queue based on the document flow's configuration, which can include an indication of these properties. In some embodiments, the configurable queue processor can dynamically reconfigure document flow to handle documents with a different set of metadata or properties.

Figure 9:
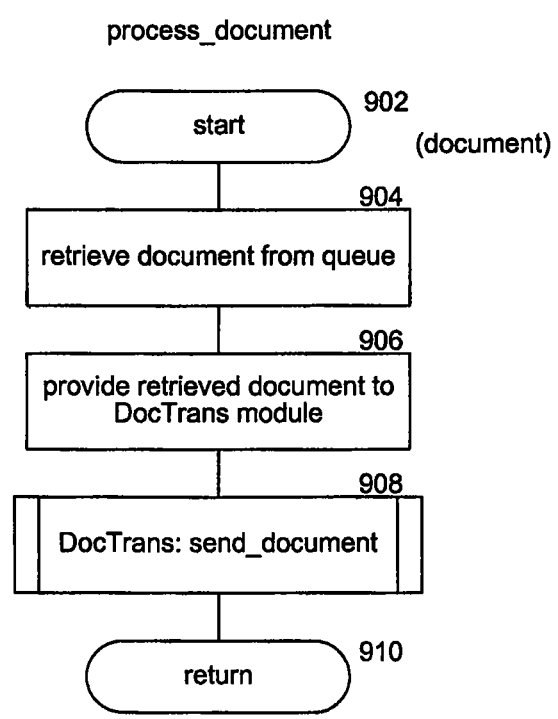
FIG. 9 is a flow diagram illustrating a process_document routine invoked by a document flow in some embodiments.

FIG. 9 is a flow diagram illustrating a process_document routine invoked by a document flow in some embodiments. The process_document routine starts at block 902 where it receives an indication of a document.

At block 904, the routine retrieves the document. In various embodiments, the routine may actively check a queue for pending documents and retrieve documents the document flow associated with the routine is configured to handle. Logic to check the queue is not illustrated. In various embodiments, the routine receives an indication of the document, such as from a queue handling component.

At block 906, the routine provides the retrieved document to a DocTrans module associated with the document flow component that invokes the routine. As an example, the routine may invoke an application program interface ("API") provided by the associated DocTrans module to provide the document.

At block 908, the routine invokes a send_document routine provided by the DocTrans module's API to forward or otherwise handle the document. The send_document routine was described above in detail in relation to FIG. 2.

At block 910, the routine returns.

Figure 10:
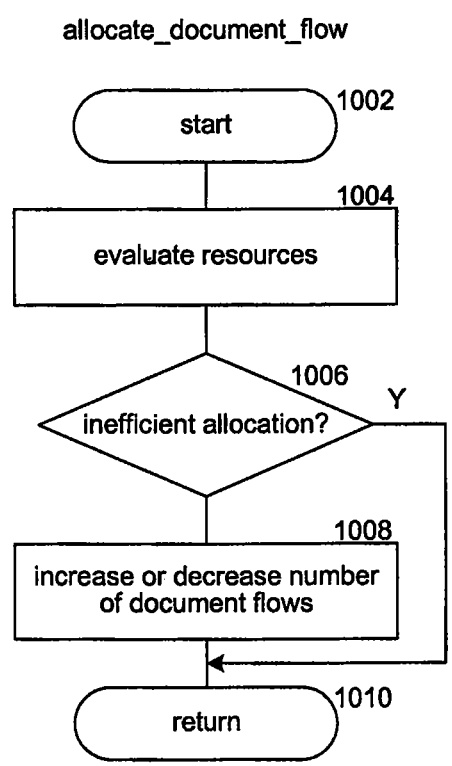
FIG. 10 is a flow diagram illustrating an allocate_document_flow routine invoked by a configurable queue processor in some embodiments.

FIG. 10 is a flow diagram illustrating an allocate_document_flow routine invoked by a configurable queue processor in some embodiments. The configurable queue processor invokes the routine to allocate or deallocate document flows. The routine begins at block 1002.

At block 1004, the routine evaluates resources, such as system resources, associated with the document server at which the routine is invoked or the server with which the configurable queue processor is associated. Examples of resources include processor, memory, storage, network bandwidth, and so forth. The routine may also evaluate the length of the queue of pending documents.

At block 1006, the routine determines whether there is an efficient allocation of document flows. The routine can make this determination by evaluating the queue, system resources, document flows, and so forth. As an example, the routine can evaluate the number and type of pending documents in the queue and processor load to determine whether there is an efficient allocation of document flows. If documents are flowing through the system within some defined threshold period of time, the routine may determine that the document flows are efficiently allocated. In such a case, the routine continues at block 1010, where it returns. Otherwise, the routine continues at block 1008.

At block 1008, the routine increases or decreases the number of document flows, such as by allocating additional document flows or deallocating document flows.

At block 1010, the routine returns.

Figure 11:
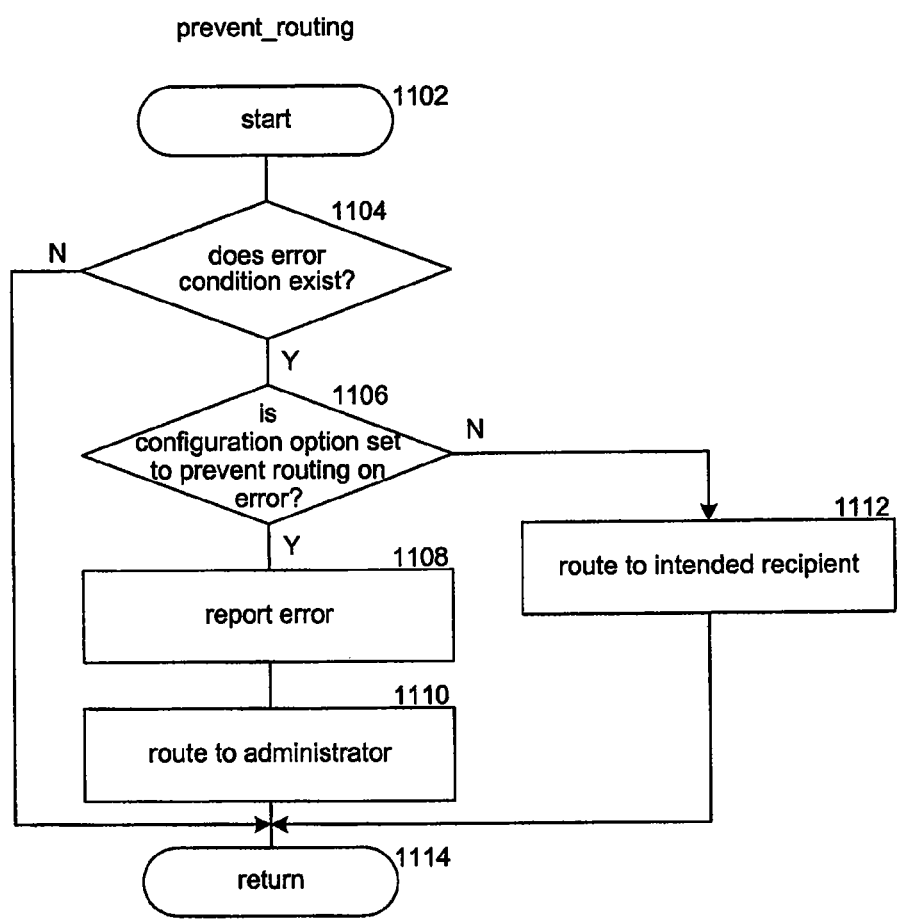
FIG. 11 is a flow diagram illustrating a prevent_routing routine invoked by the configurable document server in some embodiments.

FIG. 11 is a flow diagram illustrating a prevent_routing routine invoked by the configurable document server in some embodiments. The routine begins at block 1102.

At decision block 1104, the routine determines whether an error condition exists. An error condition can exist when a document could not be converted from one format to another, when a facsimile transmission error occurs, or another error condition occurs relating to the configurable document server. The error detection can be made by a facsimile board connected to the document server when a facsimile document is received, facsimile software, such as server facsimile software, or other hardware or software component. If an error condition exists, the routine continues at decision block 1106. Otherwise, the routine returns at block 1114.

At decision block 1106, the routine determines whether a configuration option is set to prevent routing when an error condition exists. If that is the case, the routine continues at block 1108. Otherwise, the routine continues at block 1112.

At block 1108, the routine reports an error. As examples, the routine can report errors to an administrator, a sender of the document, a user attempting to convert the document, and so forth. When the routine reports an error, the configurable document server may, in addition to preventing the document from being routed or forwarded to the intended recipient, take various workflow-related actions, such as notifying users or workflow processes, suspend workflow, and so forth. The routine may also take queue-related actions, such as archiving workflow tasks until a notified user takes an action, the workflow task expires, and so forth.

At block 1110, the routine may route the document to an administrator for further analysis and troubleshooting. The routine then returns at block 1114.

At block 1112, the routine routes the document to the intended recipient because no error was detected. The routine then returns at block 1114.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list. Although the terms "dialing rules" or "routing rules" may be used together or individually, the terms can refer to either or both types of rules.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described-above can be combined to provide further embodiments.

Any patents and applications and other references noted above, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description describes certain embodiments of the invention, and describes the best mode contemplated, no matter how detailed the above appears in text, the invention can be practiced in many ways. Details of the document transport layer may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A method of routing documents in a network environment, comprising: receiving, at a document server having a processor and non-transitory computer memory including a prevent routing routine and computer instructions executable by the processor, the document server configured to service document processing requests, multiple documents from network nodes or devices in the network environment, the multiple documents including a document of a first type; a configurable queue processor allocating one or more document flows to handle the multiple documents, individual ones of the one or more document flows configured to handle the multiple documents according to type; the document server invoking the prevent routing routine embodied on the non-transitory computer memory; the prevent routing routine determining whether at least one of a plurality of error conditions relating to the document server, the document, or a transmission of the document exists based on error detection made by a facsimile board, facsimile software, or hardware or software component connected to the document server when the document is received; if an error condition exists, the prevent routing routine determining whether a configuration option is set to prevent routing when the error condition exists; routing or forwarding the document to an intended recipient upon receiving the document, wherein the routing or forwarding the document comprises: an allocated document flow communicating with a universal document transport module to process the document of the first type or forward the document of the first type for processing, the universal document transport module operating independently of an originating message service or source of the document; and if the configuration option is set to prevent routing when the error condition exists, preventing the document from being routed or forwarded to the intended recipient and reporting the error condition.

2. The method according to claim 1, wherein the configuration option associated with the error condition is set to prevent routing when the error condition exists and wherein the document server further operates to take a plurality of workflow-related actions.

3. The method according to claim 2, wherein the plurality of workflow-related actions includes notifying users or workflow processes.

4. The method according to claim 2, wherein the plurality of workflow-related actions includes suspending a workflow process.

5. The method according to claim 1, wherein the configuration option associated with the error condition is set to prevent routing when the error condition exists and wherein the document server further operates to take a plurality of queue-related actions.

6. The method according to claim 5, wherein the plurality of queue-related actions includes archiving a workflow task until a notified user takes an action or until the workflow task expires.

7. The method according to claim 1, wherein the configuration option associated with the error condition is set to prevent routing when the error condition exists and wherein the error condition is reported to an administrator, a sender of the document, a user attempting to convert the document, or a combination thereof.

8. A computer program product comprising at least one non-transitory computer readable medium storing a computer program comprising instructions translatable by at least one processor to perform: allocating one or more document flows to handle multiple documents received at a document server, individual ones of the one or more document flows configured to handle the multiple documents according to type, the multiple documents including a document of a first type; determining whether at least one of a plurality of error conditions relating to the document of the first type received at the document server, the document server, or a transmission of the document exists based on error detection made by a facsimile board, facsimile software, or hardware or software component connected to the document server when the document is received, the document server configured to service document processing requests from network nodes or devices in a network environment; if an error condition exists, determining whether a configuration option is set to prevent routing when the error condition exists; if the configuration option is not set to prevent routing when the error condition exists, routing or forwarding the document to an intended recipient upon receiving the document, wherein the routing or forwarding the document comprises: an allocated document flow communicating with a universal document transport module to process the document of the first type or forward the document of the first type for processing, the universal document transport module operating independently of an originating message service or source of the document; and preventing the document from being routed or forwarded to the intended recipient and reporting the error condition.

9. The computer program product of claim 8, wherein the configuration option associated with the error condition is set to prevent routing when the error condition exists and wherein the instructions are further translatable by the at least one processor to perform a plurality of workflow-related actions.

10. The computer program product of claim 9, wherein the plurality of workflow-related actions includes notifying users or workflow processes.

11. The computer program product of claim 9, wherein the plurality of workflow-related actions includes suspending a workflow process.

12. The computer program product of claim 8, wherein the configuration option associated with the error condition is set to prevent routing when the error condition exists and wherein the instructions are further translatable by the at least one processor to perform a plurality of queue-related actions.

13. The computer program product of claim 12, wherein the plurality of queue-related actions includes archiving a workflow task until a notified user takes an action or until the workflow task expires.

14. The computer program product of claim of claim 8, wherein the configuration option associated with the error condition is set to prevent routing when the error condition exists and wherein the error condition is reported to an administrator, a sender of the document, a user attempting to convert the document, or a combination thereof.

15. A system for routing documents in a network environment, comprising: at least one processor; at least one non-transitory computer readable medium storing instructions translatable by the at least one processor to perform: allocating one or more document flows to handle multiple documents received at a document server, individual ones of the one or more document flows configured to handle the multiple documents according to type, the multiple documents including a document of a first type; determining whether at least one of a plurality of error conditions relating to the document of the first type received at the document server, the document-server, or a transmission of the document exists based on error detection made by a facsimile board, facsimile software, or hardware or software component connected to the document server when the document is received, the document server configured to service document processing requests from network nodes or devices in a network environment; if an error condition exists, determining whether configuration option is set to prevent routing when the error condition exists; if the configuration option is not set to prevent routing when the error condition exists, routing or forwarding the document to an intended recipient upon receiving the document, wherein the routing or forwarding the document comprises: an allocated document flow communicating with a universal document transport module to process the document of the first type or forward the document of the first type for processing, the universal document transport module operating independently of an originating message service or source of the document; and if the configuration option is set to prevent routing when the error condition exists, preventing the document from being routed or forwarded to the intended recipient and reporting the error condition.

16. The system of claim 15, wherein the configuration option associated with the error condition is set to prevent routing when the error condition exists and wherein the instructions are further translatable by the at least one processor to perform a plurality of workflow-related actions.

17. The system of claim 16, wherein the plurality of workflow-related actions includes notifying users or workflow processes.

18. The system of claim 16, wherein the plurality of workflow-related actions includes suspending a workflow process.

19. The system of claim 15, wherein the configuration option associated with the error condition is set to prevent routing when the error condition exists and wherein the instructions are further translatable by the at least one processor to perform a plurality of queue-related actions.

20. The system of claim 19, wherein the plurality of queue-related actions includes archiving a workflow task until a notified user takes an action or until the workflow task expires.

* * * * *

UNITED STATES PATENT AND TRADEMARK OFFICE
CERTIFICATE OF CORRECTION

PATENT NO. : 9,277,092 B2
APPLICATION NO. : 12/495743
DATED : March 1, 2016
INVENTOR(S) : Jason K. Webster et al.

Page 1 of 1

It is certified that error appears in the above-identified patent and that said Letters Patent is hereby corrected as shown below:

In the claims,

Claim 1:

Column 13, Line 48, insert -- if the configuration option is not set to prevent routing when the error condition exists, -- between "exists;" and "routing"

Claim 8:

Column 14, Line 48, insert -- if the configuration option is set to prevent routing when the error condition exists, -- between "and" and "preventing"

Signed and Sealed this
Fourteenth Day of June, 2016

Michelle K. Lee
*Director of the United States Patent and Trademark Office*